(12) United States Patent
Wong et al.

(10) Patent No.: US 8,705,729 B2
(45) Date of Patent: Apr. 22, 2014

(54) AUDIO CONTENT PROTECTION

(75) Inventors: Kar Leong Wong, Bayan Lepas (MY);
Suryaprasad Kareenahalli, Folsom, CA (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/971,210

(22) Filed: Dec. 17, 2010

(65) Prior Publication Data

US 2012/0155633 A1   Jun. 21, 2012

(51) Int. Cl.
*H04K 1/00* (2006.01)
*H04L 9/00* (2006.01)
*H04L 9/28* (2006.01)

(52) U.S. Cl.
USPC ............................................................. 380/28

(58) Field of Classification Search
USPC ........................................................ 380/28
See application file for complete search history.

(56) References Cited

U.S. PATENT DOCUMENTS

| | | |
|---|---|---|
| 7,219,224 B1 | 5/2007 | Sun |
| 2002/0032853 A1* | 3/2002 | Preston et al. ................ 713/151 |
| 2006/0198520 A1 | 9/2006 | Courtney et al. |
| 2008/0120675 A1* | 5/2008 | Morad et al. ................. 725/120 |
| 2008/0240230 A1 | 10/2008 | Oxman et al. |
| 2009/0228707 A1* | 9/2009 | Linsky ......................... 713/171 |
| 2010/0027790 A1 | 2/2010 | Vembu et al. |
| 2010/0146501 A1 | 6/2010 | Wyatt et al. |

FOREIGN PATENT DOCUMENTS

| | | |
|---|---|---|
| WO | 2012/082411 A2 | 6/2012 |
| WO | 2012082411 A3 | 8/2012 |

OTHER PUBLICATIONS

International Search Report and Written Opinion received for PCT Patent Application No. PCT/US2011/063160, mailed on Jun. 27, 2012, 10 pages.

\* cited by examiner

*Primary Examiner* — William Powers
*Assistant Examiner* — Stephen Sanders
(74) *Attorney, Agent, or Firm* — International IP Law Group, P.L.L.C.

(57) ABSTRACT

In some embodiments an embedded processor is to participate in cryptographic key exchange with an audio software application, and a key exchange communication path is coupled between the audio software application and the embedded processor. Other embodiments are described and claimed.

21 Claims, 4 Drawing Sheets

AUDIO CONTENT PROTECTION

TECHNICAL FIELD

The inventions generally relate to audio content protection.

BACKGROUND

Previous implementations of content protection use a hard-coded global key and a key exchange in which simple message passing of the new session key is wrapped with the global key. This key exchange involves a single unwrapping of the session key using the previously agreed upon global key, and has been used only for video content protection.

A High Definition Audio (HD-Audio) codec is available that carries out simple key exchange that is proprietary to the specific audio codec, and merely indicates to the application software that the content protected state is ON, assuming that the audio function driver is trusted.

Audio content protection currently is provided using a dedicated content protection session manager implemented in hardware. In order to reduce the complexity of the hardware implementation, a less robust content protection session is typically implemented. For example, a global key generation mechanism is used which exposes the risk of "break once attack all", where one broken system jeopardizes all systems. Additionally, each audio codec implements its dedicated interface to carry out the key exchange to set up a content protected session and to implement a dedicated decryption engine to decrypt the protected audio data.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to audio content protection.

In some embodiments an embedded processor is to participate in cryptographic key exchange with an audio software application, and a key exchange communication path is coupled between the audio software application and the embedded processor.

In some embodiments a cryptographic key exchange is performed between an audio software application and an embedded processor using a key exchange communication path.

Figure 1:
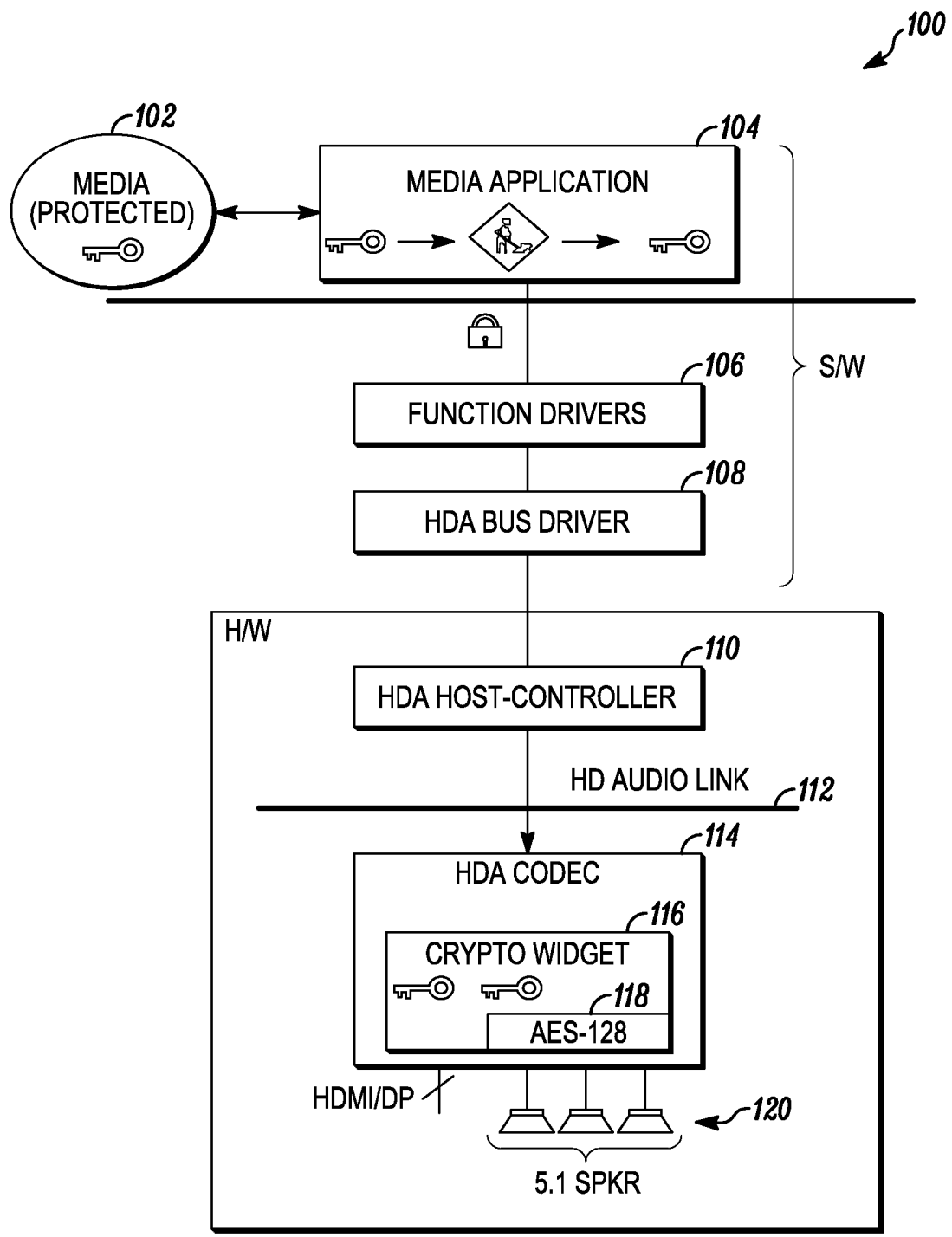
FIG. 1 illustrates a system according to some embodiments of the inventions.

FIG. 1 illustrates a system 100 according to some embodiments. In some embodiments system 100 illustrates a content protection stack. In some embodiments, system 100 includes protected media 102, media application 104, function drivers 106, a High Definition Audio (HDA) bus driver 108, HDA host controller 110, High Definition (HD) Audio Link 112, HDA coder/decoder (codec) 114 that includes a crypto widget 116 and encryption 118 (for example Advanced Encryption Standard and/or AES-128), and one or more speakers 120. In some embodiments, the media application 104, function drivers 106, and/or HDA bus driver 108 are implemented in software. In some embodiments, HDA host controller 110, HD Audio Link 112, HDA codec 114, crypto widget 116, and/or encryption 118 are implemented in hardware. In some embodiments, HDA codec 114 includes a High Definition Multimedia Interface (HDMI) and/or a Display Port (DP) connection (HDMI/DP connection) that allows an external output medium such as Audio/Visual (A/V), a Television (TV) or monitor speaker, etc. to be coupled to the HDA codec 114.

In some embodiments, system 100 relates to Advanced Access Content System (AACS) Audio Content Protection and/or High Definition Audio (HDA) content protection. In some embodiments, HDA content protection is the audio path of a chipset implementation (for example, a platforms controller hub or PCH implementation) which takes in an encrypted audio stream from an application. In some embodiments, this implementation is a backend content protection implementation, which, for example, covers both video and audio content. In some embodiments, an audio codec (and/or HDA codec) that supports HDA content protection includes a crypto widget (CW) such as crypto widget 116 which communicates with an application (for example, application 104) to carry out authentication, key exchange, session key generation, stream key unwrap, and/or decrypting the encrypted audio stream.

In some embodiments, authentication and key exchanges occur between applications 104 and the function driver 106 (which forward to the audio codec hardware to do the actual processing) before a content protected stream can be played.

In some embodiments, three stages occur in the process of setting up an HA content protection session. This includes a certificate exchange that may only need to occur once in the lifetime of the platform, a key exchange that occurs once for every session key request (typically when a new application is launched), and a session key generation/derivation that occurs as a result of a successful key exchange. Once the content protection session has been set up, one or more content protected audio streams may be played. According to some embodiments, certification exchanges occur by the application initiating the certificate exchange, the hardware (for example, platform controller hub hardware) verifies, and if successful, the hardware replies, and the application then verifies.

In some embodiments, session key exchange and generation occurs by the application generating a key pair, and then signing it and sending it to the hardware with an exchange session key message. The hardware then verifies, and if successful, generates a key pair and signs it and sends it to the application. Assuming that both signatures are verified both sides have enough information and are able to derive the session key (for example, by using the same SHA-256 and/or truncation algorithm). The application can use the session key to allocate as many stream keys as it wants and can encrypt them using the session key before sending them to the codec hardware.

For each new stream a random number is generated by the application and becomes the stream key. There can be multiple streams so each new stream key is encrypted with the session key and passed to the hardware (for example, to the codec 114 and/or to an embedded processor such as a manageability engine or ME). Audio content for that stream is encrypted with the stream key by the application, placed in system memory, and then passed down the audio stack in its encrypted form to the hardware (codec and/or ME). Decryption is performed in the codec (and/or ME) using the stream key.

In some embodiments, raw audio samples are encrypted by encryption 118 using, for example, AES-128 using the negotiated stream key on 128 bit chunks. The samples sequence in the memory is no different than the normal audio stream. According to some embodiments, 128 bit boundary need not be sample size aligned (for example, 20 bit audio samples are guaranteed to be aligned on 128 bit boundary only once every five 128-bit chunks). The application places the encrypted samples in a memory buffer (for example, a memory buffer of the HDA controller) in the same manner as done for unencrypted samples. Every encrypted sample of the 128 bit chunk can be "zero-padded" to fit (for example, for a 20 bit sample size, 20 bit blocks are "zero-padded" to the least significant bits to fit in 32 bit containers according to some embodiments). For a sample that is being broken into two separate 128 bit encryption chunks, for example, a combination is made between the most significant bits of the earlier encrypted chunk and the least significant bits of the later encrypted 128 bit chunk.

According to some embodiments, the application uses appropriate APIs to find a device that can support a content protected (CP) data format. The application uses an appropriate API to open a suitable device, communicated through the function driver (FD). The application uses an appropriate API to acquire resources for the session and set the stream format (bps, channels, etc). In some embodiments the stream format will be a non-PCM (non-pulse code modulation) format, although the encrypted content can be PCM samples. The application uses an appropriate API to authenticate the audio codec and establish stream keys. The application then prepares the encrypted content buffers in memory and uses the API to play the stream. When the application is done, it uses the API to stop the message to the audio codec to dismantle the keys. The application will not place content protected high-definition audio data in the clear (that is, unprotected) in an unprotected system memory. For Advanced Access Content System (AACS) audio content, high-definition content is defined, for example, as better than 48 kHz sampling rate and greater than 16-bit sampling depth.

According to some embodiments, there are several API messages introduced for the application to carry out content protection (CP) tasks. These messages are returned, for example, with a status rather than the actual response if the function driver (FD) is not in an operational state. According to some embodiments, these message statuses can include one or more of the following:

Initializing—indicates that the FD is starting up or going through a restart due to Crypto Service interruption. The application should retry at a later point.

Not supported—indicates that the CP feature is not detected or a critical error has been detected. The application should not enter any more CP related messages.

Error—indicates that the command cannot be completed. The application should check whether the Crypto Service has gone through a re-initialization due to unexpected disruption. Otherwise, it should be treated as an error in issuing the API.

Get Crypto Capability—Sent by the application to the FD to report the audio device capability in supporting CP tasks. This is typically used once to check a newly exposed audio device crypto capability.

Exchange Certificates—Sent by the application to the FD to request for a certificate during the authentication process. This is typically used once to authenticate a newly exposed audio device.

Initiate New Session—Sent by the application to the FD to request to open a new encrypted session, and get a session number slot assigned. This is typically used when the application is launched.

Exchange Session Key—Sent by the application to the FD to request generation of a session key. This is typically used when the application is launched.

Initiate New Stream—Sent by the application to the FD to request opening of a new encrypted stream, and to get a stream key number slot assigned. This is typically used just before the application begins playing a CP audio stream.

Send Wrapped Stream Key—Sent by the application to the FD to pass the stream key for the CP audio stream to be played. This is typically used just before the application begins playing a CP audio stream.

Invalidate Stream Key—Sent by the application to the FD to invalidate the session key used for the application. This is typically used when the application is closing.

Get Session Status—Sent by the application to the FD to check the status of the session slot. This is typically used for query or debug.

Get Stream Status—Sent by the application to the FD to check the status of the stream slot. This is typically used for query or debug.

Get Crypto Status—Sent by the application to the FD to check the number of inactive encrypted session and stream slots available in the CW that the application can still make use of. This is typically used for query or debug.

According to some embodiments, most of the API messages that occur between the application and the function driver (FD) are translated to a task to be completed by the Crypto Widget (CW) in the audio codec. The communication between the FD and the CW hardware is carried out using crypto commands. Each crypto command can be transferred using one or more macro commands, where each macro command has a limited number of data bytes than can be issued and/or returned. Each macro command is issued using a series of command verbs over the HDA Link to the audio codec, which are also known as crypto micro commands. The CW in the audio codec receives the sequence of command verbs and interprets it to a macro command, and later assembles it back to the original crypto command.

Figure 2:
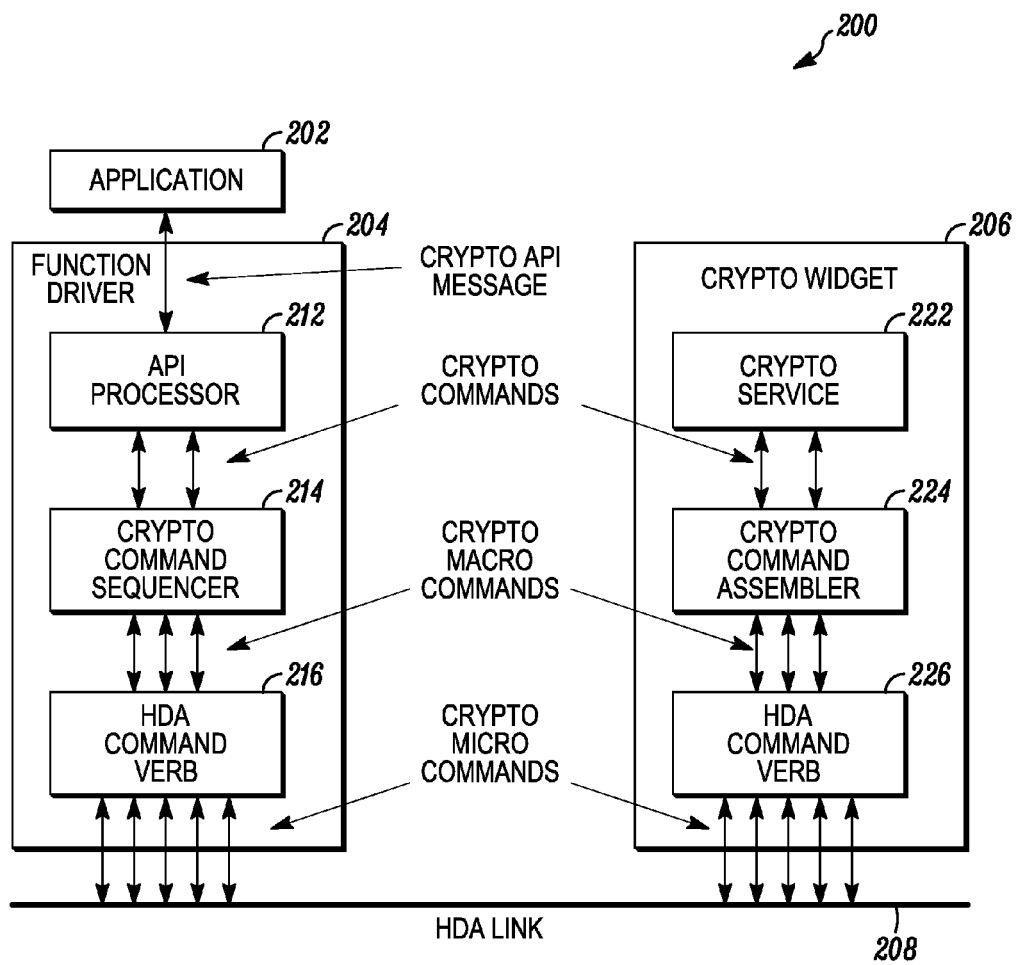
FIG. 2 illustrates a system according to some embodiments of the inventions.

FIG. 2 illustrates a system 200 according to some embodiments. In some embodiments, system 200 relates to audio content protection communication. In some embodiments, there are different levels of communication from an application (APP) to the High Definition Audio (HDA) Codec Crypto Widget (CW). System 200 illustrates according to some embodiments the abstraction of those communications between different stacks. In some embodiments, system 200 includes an application 202 (for example, in some embodiments, a software application), a function driver 204, a crypto widget 206, and a High Definition Audio (HDA) Link 208. In some embodiments, function driver 204 includes an Application Programming Interface (API) processor 212, a crypto command sequencer 214, and a High Definition Audio (HDA) command verb 216. In some embodiments, crypto widget 206 includes crypto service 222, crypto command assembler 224, and High Definition Audio (HDA) command verb 226.

In some embodiments, communication between the application 202 and the function driver 204 is through crypto API messages. The API message processor 212 in the function driver 204 processes the message and in some embodiments translates it into a crypto command or multiple crypto commands to complete the action. The crypto command sequencer 214 further splits a crypto command into one or multiple crypto macro commands depending on the payload size, and then sends it to the HDA Link 208 via an HDA bus interface (and/or HDA command verb 216). The HDA interface 216 issues a crypto macro command using a series of crypto command verbs (also called crypto micro command). When these crypto micro commands reach the crypto widget (CW) of the HDA codec, these micro commands are translated back to crypto macro commands. The crypto macro commands are further combined into a single crypto command, if necessary, before being passed along to the crypto service block. Once the crypto service block has received the complete crypto command it can also take necessary action as indicated by the crypto command.

In some embodiments, one or more of the following command verbs are available for issuing a macro command:

Crypto Command Initiate with Payload—The 'set' command verb requests the hardware to give permission for sending the macro command with the specified payload size. The 'get' command verb reads the status of the request. When the hardware has enough buffers to accept the command, the status will be granted.

Crypto Command Initiate without Payload—The 'set' command verb requests the hardware to give permission for sending the macro command without payload. The 'get' command verb reads the status of the request. When the hardware has enough buffers to accept the command, the status will be granted.

Crypto Command Code—The 'set' command verb programs the crypto command code for the current macro command, after getting permission for sending.

Crypto Command Payload—The 'set' command verb programs the crypto command payload for the current macro command, after setting the crypto command code. This will be repeated until the complete specified payload size has been issued.

Crypto Command Execute—The 'set' command verb executes the current crypto macro command after the command code and the data payload (if existing) has been issued.

Crypto Response Payload—The 'get' command verb reads the response payload of the crypto command, if any.

According to some embodiments, one or more of the following crypto commands are used:

Send Certificate—Sent by the FD to the CW as part of the exchange certificate API task. The application certificate is sent for authentication.

Get Certificates—Sent by the FC to the CW as part of the exchange certificate API task. The will get the hardware certificate for authentication.

Send Session Key Data—Sent by the FD to the CW as part of the exchange session key API task. This will send an application signature for key verification and generation.

Get Session Key Data—Sent by the FD to the CW as part of the exchange session key API task. This will send a hardware signature for key verification and generation.

End Session—Sent by the FD to the CW to end an ongoing encrypted session, which is a result of the Invalidate Session Key API task.

Unwrap Stream Key—Sent by the FD to the CW to forward the key blob for unwrapping to become the stream key, which is a result of Send Wrapped Stream Key API task.

Set Stream for External—Sent by the FD to the CW to indicate the encrypted stream is for partnered external codec and therefore requires re-encryption before sending out, which is a result of the ED determined target of the stream.

End Stream—Sent by the FD to the CW to end an ongoing encrypted stream, which is a result of the Invalidate Stream Key API task.

Get Session Status—Sent by the FD to the CW to check the status of the session slot, which is a result of the Get Session Status API task.

Get Stream Status—Sent by the FD to the CW to check the status of the stream slot, which is a result of the Get Stream Status API task.

Get Crypto Status—Sent by the FD to the CW to check the number of inactive encrypted session and stream slots available in the CW that the application still can make use of, which is a result of the Get Crypto Status API task.

Get Extended Capability—Sent by the FD to the CW to report the extended crypto capabilities on top of the standard crypto widget capabilities declared, which is a result of the Get Crypto Capability API task.

Figure 3A:
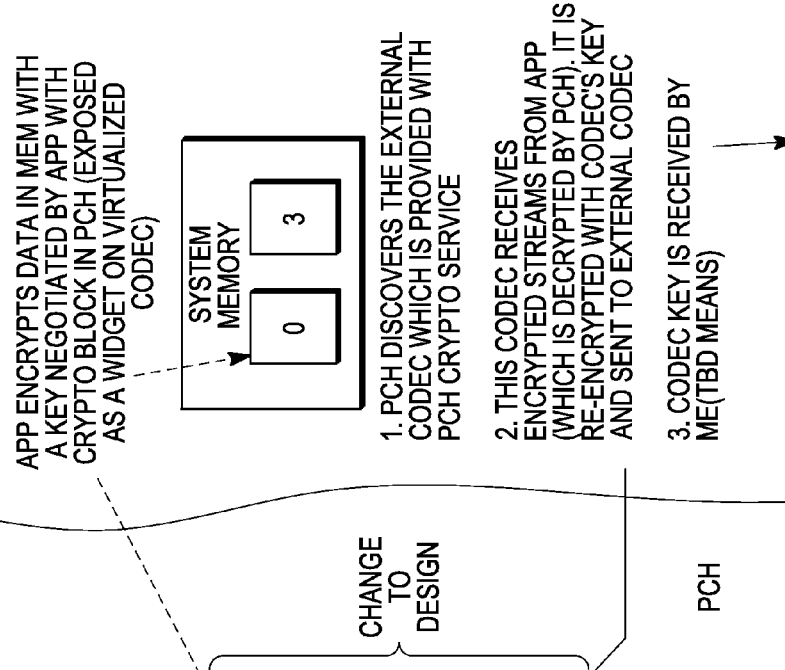
FIG. 3 illustrates a system according to some embodiments of the inventions.
Figure 3A:
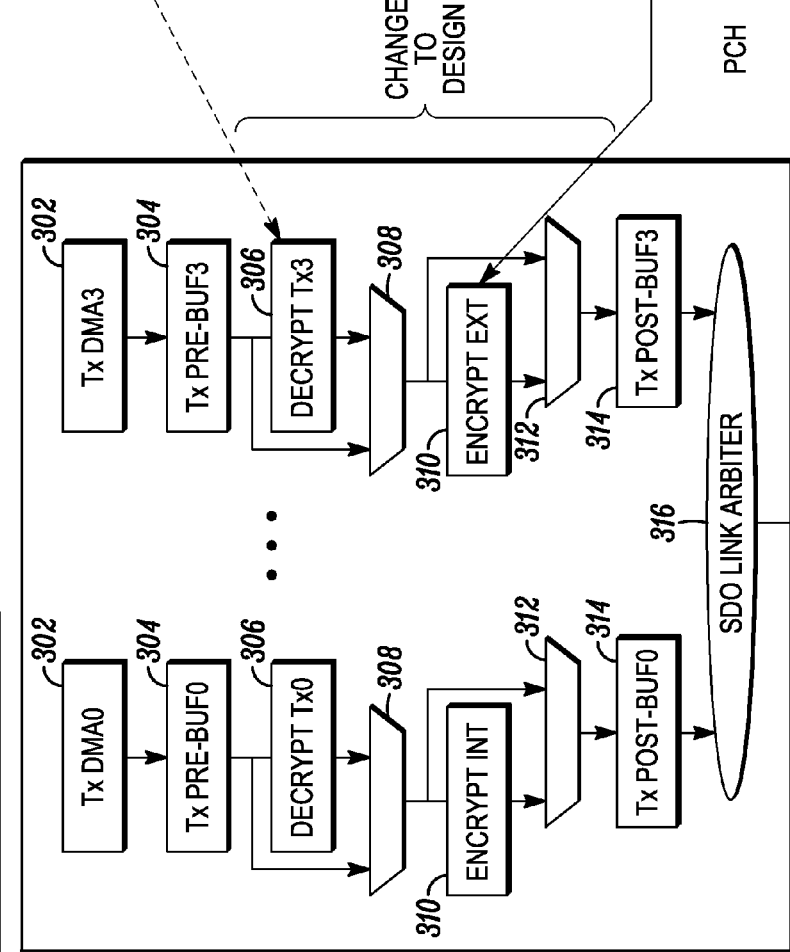
Figure 3B:
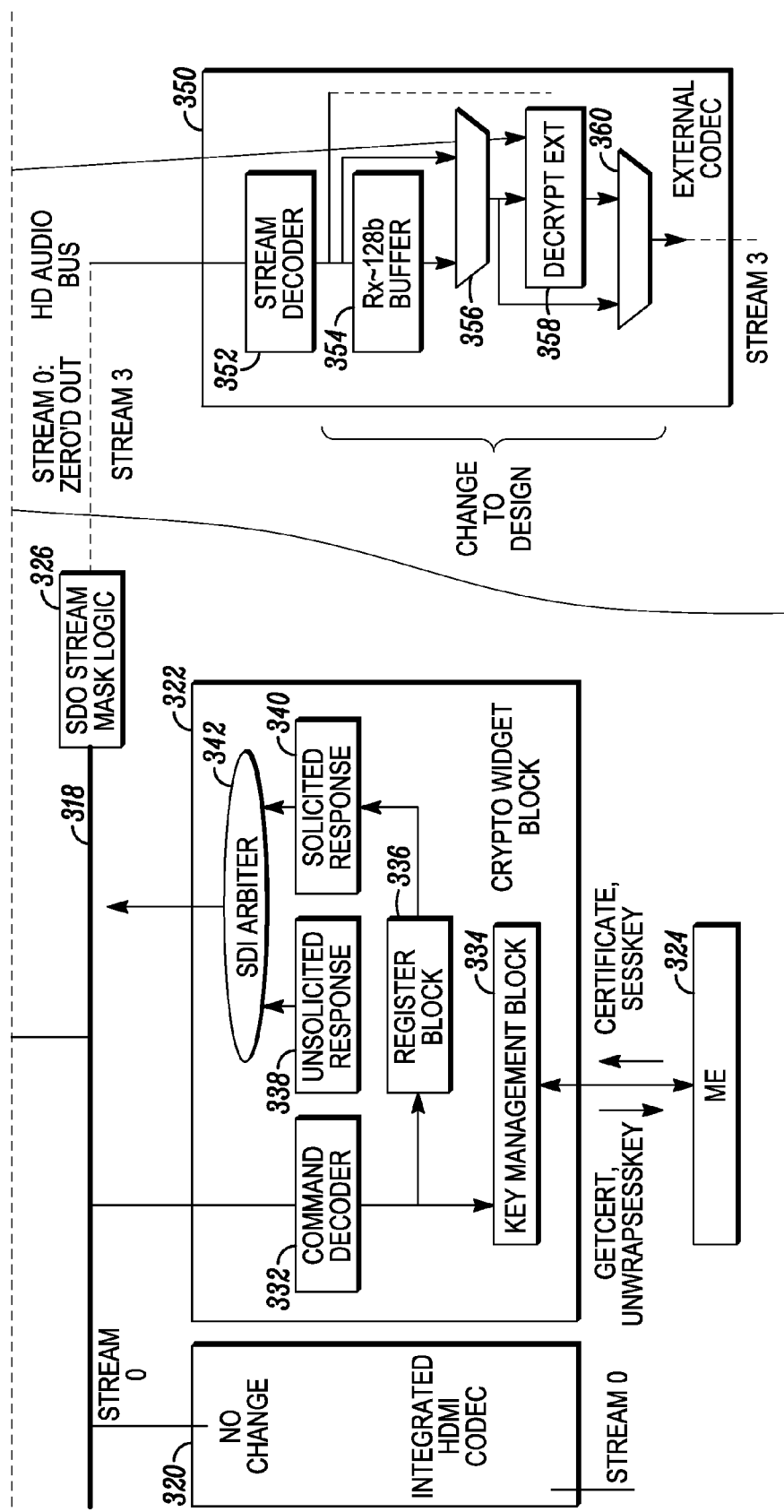

FIG. 3 illustrates a system 300 according to some embodiments. In some embodiments, system 300 includes, for example, a plurality of transmit DMA devices 302, a plurality of transmit buffers 304, a plurality of decryption engines 306, a plurality of multiplexers 308, a plurality of encryption engines 310, a plurality of multiplexers 312, a plurality of transmit post buffers 314, a Serial Data Out (SDO) link arbiter 316, a high definition (HD) Audio Bus 318, an integrated High Definition Multimedia Interface (HDMI) codec 320, a crypto widget (CW) block 322, a manageability engine (ME) 324, and SDO stream mask logic 326. In some embodiments, the plurality of transmit DMA devices 302, the plurality of transmit buffers 304, the plurality of decryption engines 306, the plurality of multiplexers 308, the plurality of encryption engines 310, the plurality of multiplexers 312, the plurality of transmit post buffers 314, the SDO link arbiter 316, the HD Audio Bus 318, the integrated HDMI codec 320, the CW block 322, the ME 324 and/or the SDO stream mask logic 326 are implemented in hardware (for example, in some embodiments in a platform controller hub or PCH). In some embodiments, the CW block 322 includes a command decoder 332, a key management block 334, a register block 336, an unsolicited response block 338, a solicited response block 340, and/or a Serial Data In (SDI) arbiter 342.

In some embodiments, an external codec 350 is coupled to the HD Audio Bus 318. In some embodiments, external codec 350 includes a stream decoder 352, a receiver buffer 354 (for example, a 128 bit receiver buffer), a multiplexer 356, a decryption engine 358, and/or a multiplexer 360.

In some embodiments, an application encrypts data in memory (for example, in system memory) with a key negotiated by the application with a CRYPTO block (for example, in the PCH) that is exposed as a widget on a virtualized codec.

In some embodiments, the PCH discovers the external codec 350 which is provided with a PCH crypto service. This codec receives encrypted streams from an application which is decrypted by the PCH (for example, using one or more of the encryption engines 310), which is re-encrypted by the PCH with the codec's key and sent to the external codec 350. The codec key is received by the ME 324 over a network from the codec's website, for example.

In some embodiments, the CW block 322 provides the certificate and the unwrapped session key to the ME 324. In some embodiments, the ME 324 provides a certificate and session key to the CW block 322.

In some embodiments, as the authentication and key exchange requires an extensive amount of storage and processing power to be implemented in each individual audio codec, the system 300 implements only one Crypto Widget (CW) 322 and/or is shared with the Integrated HDMI codec 320 and/or one or more external audio codecs such as external codec 350 (for example, one or more selected partnered external audio codecs).

In some embodiments a Virtualizer Engine (VE) aggregates the Integrated HDMI codec 320 and the CW block 322 as well as a partnered external audio codec as a single PCH virtual codec to the application. The VE re-directs the received verb to the correct audio codec. In some embodiments, a VE is not required if there is only one internal HDMI codec and the CW is supported for content protection.

In some embodiments, the CW 322 uses assistance from the ME 324 to carry out actual authentication and key exchange work. In some embodiments, a decrypt engine is included in the HDA controller to be shared with the output stream for decrypting the application encrypted audio data. The stream key used form decryption is assigned by the CW. The internal HDMI codec 320 enables high definition content protection (HDCP) over the HDMI connection link to an HDMI sync device, which make sure that the digital audio data is encrypted. The HDA controller sends digital audio data in the clear through an internal HDA link (for example, via the HD Audio Bus 318) to the internal HDMI codec 320. In some embodiments, a partnered external audio codec such as codec 350 implements content protection over the HDA Link so that the audio stream is not exposed in the clear. The HDA controller re-encrypts the digital audio data for the partnered external codec to help facilitate this. In some embodiments, a session key negotiation needs to be carried out with the partnered external codec at boot time. In some embodiments, a CW is included in the external codec (for example, a CW with limited functionality). In some embodiments the same crypto command verbs are used to send crypto commands to the CW.

In some embodiments, one or all external codecs have a global codec key that is maintained as a very sensitive secret. This key is implemented in a very robust and tamper-resistant fashion. In some embodiments, a PCH codec key is implemented as a global secret in all PCHs. This key is also implemented in a very robust and tamper resistant fashion. In some embodiments, the external codec global codec key and the PCH codec key (for example, as a wrapped global key) are stored in some or all of the external codecs not as fuses but embedded in silicon. In some embodiments, upon every boot the VE sends a Get External Codec Keys crypto command to request the wrapped global key as well as a verification message. If the external codec global key is unwrapped and successfully verified, the VE requests the ME to generate a new external codec key, wraps it with the external codec global key, and sends back the wrapped key to the external codec using a Send External Codec Wrapped Key Session Key crypto command. The VE then issues a Get External Codec Wrapped Verify Key to get a message for verifying that the external codec has unwrapped the new session key successfully. If successful, the VE aggregates and exposes the external codec as part of the PCH virtual codec. If not, the external codec is exposed as a standalone codec like any other normal codec.

In some embodiments, a session key negotiation is carried out with the partnered external codec at boot time. In some embodiments, an external audio codec includes a CW with limited functionality. In some embodiments, the same crypto command verbs are used to send a crypto command to the CW (for example, to the CW in the external codec).

In some embodiments, raw audio samples are AES-128 encrypted using the negotiated external codec key in 128 bit chunks. In some embodiments, the samples sequence on the HDA Link is no different than a normal audio stream (for example, as in the HDA Specification). In some embodiments, a 128 bit boundary need not be sample size aligned (for example, with 20 bit audio samples guaranteed to be aligned on 128 bit boundary only once every five 128-bit chunks). In some embodiments; the external coded accumulates the next frame of audio samples to get the complete 128 bit chunk for decryption of the current frame of audio samples if the boundary is spread across two frames of the audio sample.

In some embodiments, the external codec crypto command list includes one or more of the following:

Get External Codec Keys—Sent by the VE to the external codec CW to request the wrapped codec global key to be returned (to receive the wrapped key for verification).

Send External Codec Wrapped Session Key—Sent by the VE to the external codec CW to deliver the wrapped session key, and assigning the new session key.

Get External Codec Wrapped Verify Key—Sent by the VE to the external codec CW to request the wrapped verify key to be returned (for verification purposes).

End External Codec Session—Sent by the VE to the external codec CW for ending an ongoing session.

Set External Codec Encrypted Stream—Sent by the FD to the external codec CW to indicate that the associated audio stream will be encrypted.

End External Codec Stream—Sent by the FD to the external codec CW to end an ongoing encrypted stream, which is a result of the Invalidate Stream Key API task.

Get External Codec Session Status—Sent by the VE or the FD to the external codec CW to check the status of the session.

Get External Codec Stream Status—Sent by the FD to the external codec CW to check the status of the stream.

Get External Codec Extended Capability—Sent by the VE or the FD to the external codec CW to report the extended crypto capabilities on top of the standard crypto widget capabilities, which is a result of the Get Crypto Capability API task.

In some embodiments, an embedded processor (for example, a Manageability Engine or ME) is used to help with content protection. In some embodiments, a sophisticated content protection (CP) session is setup using an embedded processor and a universal communication path created between the audio software stack and the embedded processor. Creation of the universal communication path between the audio software stack and the embedded processor provides flexibility in choosing which key exchange protocol best fits the platform requirements, and makes use of the embedded processor to simplify the key exchange implementation in hardware, and to allow flexibility in code development as well as upgrading the code for better security in the future. In some embodiments, the key exchange communication path and the decryption engine are integrated and/or shared. This avoids use of redundant logic replicated for each integrated audio codec, thus reducing the effort of development and validation.

According to some embodiments, audio content protection is implemented using an embedded processor, a universal communication channel between the audio software stack and the embedded processor, and a decryption engine that carries out the actual decryption tasks of protected audio data.

In some embodiments an embedded processor is utilized for many security tasks (for example, in some embodiments, the embedded processor is a Manageability Engine or ME used, for example, in a Platform Controller Hub or PCH chipset). In some embodiments, such an embedded processor handles the security task of audio content protection. The embedded processor performs key exchange with the audio application software to achieve a common session key or stream key. The application encrypts using the key and audio codec hardware decrypts using the same key. According to some embodiments, many different protocols may be used for key exchange.

In some embodiments, the universal communication channel is a transport layer that delivers key exchange API messages between the audio application software and the embedded processor (which carries out the actual message processing). The communication channel and the embedded processor are exposed as a Crypto Widget (CW) on the audio codec. In some embodiments, the audio codec is a logical audio codec that aggregates different integrated audio codec. Thus, one single Crypto Widget (CW) may be shared among all integrated audio codecs for content protection session management. The key exchange messages from the application are in the form of API messages, and the embedded processor sees the equivalent message on its interface to the communication channel.

In some embodiments, in between the embedded processor and the application software the API messages are translated into lower level packetization in order to send them over the HD-Audio link. This packet is referred to as the crypto macro command which has a bounded size. The function driver (FD) of the audio codec partitions an API message from the application into one or many crypto macro commands, depending on whether or not it can fit into the bounded size. Subsequently, the function driver sequentially sends the crypto macro command as a series of command verbs over the HD-Audio link command phase to the audio codec Crypto Widget (CW). The audio codec CW has a hardware buffer which accepts the bounded size crypto command, and forwards the macro command using a direct memory access (DMA) engine into the embedded processor memory set up for CW macro commands. The embedded processor Crypto Widget (CW) driver that controls the SW hardware re-assembles the crypto macro command, and subsequently combines back into the original API equivalent crypto command and passes to the embedded processor crypto functions for processing. When embedded processor crypto functions have finished processing, any available response is returned in a similar fashion. The embedded processor CW driver informs the CW hardware that there is a macro response available, and the CW hardware fetches it and "interrupts" the audio function driver. The audio function driver then reads the crypto macro response one by one until it gets hold of the complete crypto response, and posts it in the API buffer, and returns it to the application software.

The decryption engine of the actual protected audio data is implemented in the HD-Audio Controller of the audio stack. This implements the sharing of the decryption engine with less changes impacting the existing HD-Audio codec, such that the data sent to the internal audio codec is already decrypted. This provides no security concerns since the data is safe and clear inside the hardware.

During key exchange communication the embedded processor knows which audio stream is to be encrypted with which key. The embedded processor programs the decryption engine with the correct key matching the audio steam ID. The hardware takes over and matches the audio stream ID to see whether or not the current stream being sent out needs to be decrypted. If a match is found the audio stream is decrypted before being sent out on the link. Since the HD-Audio link is a broadcast signal, it is necessary to make sure the clear audio data (after decryption) does not appear on the external HD-Audio link. Therefore, it is mask implemented for the external HD-Audio link (for example, by being masked to zeroes) or the HD-Audio link is logically split so that the external link only sees the encrypted audio data.

In some embodiments a robust content protection arrangement is implemented using a sophisticated embedded processor (for example, an ME in a PCH chipset). According to some embodiments, any key exchange protocol may be used (for example, according to some embodiments, TLS, Diffie-Helman, etc). In some embodiments, key exchange and establishment are handled by an embedded processor. In some embodiments, hardware provides a universal key exchange communication path from the audio software stack to the embedded processor. While key exchange is sent to the embedded processor for actual processing, the software is not aware of it in some embodiments. As far as the software is aware, it is dealing with other hardware for the key exchange.

According to some embodiments, audio data decryption is implemented by aggregating integrated audio codecs as one logical audio codec, and the Crytpo Widget (CW) is shared for content protection key exchange. In some embodiments, an external audio codec is virtualized (using, for example, a Virtualizer Enginer or VE). This allows a better encrypted session to be shared with the application software. Virtualization and setup of content protection are carried out with the external audio codec in a manner that is transparent to the application software.

In some embodiments, an embedded processor is used as a crypto service agent for audio content protection. In some embodiments, the embedded processor is additionally used for video content protection and/or other security tasks. In some embodiments, a key exchange communication path is used between an audio software stack and an embedded processor. In some embodiments, a decryption engine is shared between all internal integrated audio codecs.

According to some embodiments, content protection is implemented for an integrated High Definition Multimedia Interface (HDMI) codec and/or on an integrated Display Port (DP) audio codec. In some embodiments, Wireless Display audio codecs may be supported (for example, without a Crypto Widget and/or a decryption engine).

In some embodiments, a content protection session manager that carries out key exchange and decryption of content protected audio is shared between every integrated audio codec rather than requiring for each integrated audio codec a separate content protection session manager that carries out key exchange and decryption.

Although some embodiments have been described herein as being implemented using a Manageability Engine (ME), according to some embodiments these particular implementations may not be required. For example, according to some embodiments, any processor and/or embedded processor may be used.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   an audio software application; and
   an audio codec coupled to the first processor through an audio link of the apparatus, the audio codec to receive audio data from the audio software application through the audio link, decode the audio data to generate an audio signal, and send the audio signal to one or more speakers of the apparatus;
   the audio codec comprising an embedded processor to participate in cryptographic key exchange with the audio software application through the audio link, the embedded processor to decrypt the audio data received from the audio software application.

2. The apparatus of claim 1, further comprising a decryption engine to decrypt protected audio data.

3. The apparatus of claim 2, wherein the decryption engine is to be shared by a plurality of audio codecs.

4. The apparatus of claim 1, wherein the embedded processor is a manageability engine.

5. The apparatus of claim 1, wherein the embedded processor and a key exchange communication path are included in a platform controller hub.

6. The apparatus of claim 1, wherein a key exchange communication path receives an encrypted audio stream from the audio software application.

7. The apparatus of claim 6, further comprising a decryption engine to decrypt the encrypted audio stream.

8. The apparatus of claim 7, wherein the decryption engine is to be shared by a plurality of audio codecs.

9. The apparatus of claim 1, wherein the embedded processor is to carry out the cryptographic key exchange with the audio software application to achieve a common session key or stream key.

10. The apparatus of claim 9, wherein the embedded processor is a manageability engine.

11. The apparatus of claim 9, wherein the audio software application is able to encrypt using the common session key or stream key.

12. The apparatus of claim 9, wherein the audio codec is able to decrypt using the common session key or stream key.

13. The apparatus of claim 11, wherein the audio codec is able to decrypt using the common session key or stream key.

14. A method comprising:
   performing a cryptographic key exchange between an audio software application of an apparatus and an embedded processor of an audio codec of the apparatus through an audio link of the apparatus;
   decrypting audio data using an exchanged cryptographic key; and
   sending decrypted audio data to one or more speakers of the apparatus.

15. The method of claim 14, further comprising the embedded processor decrypting protected audio data received from the audio software application.

16. The method of claim 14, wherein the embedded processor is a manageability engine.

17. The method of claim 14, further comprising receiving an encrypted audio stream from the audio software application.

18. The method of claim 17, further comprising decrypting the received encrypted audio stream.

19. The method of claim 14, further comprising performing the cryptographic key exchange to achieve a common session key or stream key.

20. The method of claim 19, further comprising encrypting using the common session key or stream key.

21. The method of claim 19, further comprising decrypting using the common session key or stream key.

* * * * *